INVENTORS
Saburo Iwata
Akira Misawa

BY Hill, Sherman, Meroni, Gross & Simpson ATTORNEYS

INVENTORS
Saburo Iwata
Akira Misawa

BY Hill, Sherman, Meroni, Gross & Simpson ATTORNEYS 3,501,832

METHOD OF MAKING ELECTRICAL WIRING AND WIRING CONNECTIONS FOR ELECTRICAL COMPONENTS

Saburo Iwata, Tokyo, and Akira Misawa, Kanagawa-ken, Japan, assignors to Sony Corporation, Tokyo, Japan, a corporation of Japan Filed Feb. 20, 1967, Ser. No. 617,374
Claims priority, application Japan, Feb. 26, 1966, 41/11,837, 41/11,838
Int. Cl. B23k *31/02*
U.S. Cl. 29—626 4 Claims

ABSTRACT OF THE DISCLOSURE

A method of making electrical wiring and wiring connections for electrical components by forming a pattern of an electrical circuit on a thermoplastic panel, placing the panel on the electrical components having electrodes to which electrical connection may be made, and heating the panel to make contact between the electrical circuit and the electrodes.

BACKGROUND OF THE INVENTION

Field of the invention

This invention relates generally to a method of making electrical wiring and wiring connections for electrical components, namely for elementary components such as a semiconductor integrated circuit device, a transistor, a diode, capacitor element, an inductive element, a resistor element, etc., and electrical assemblies of these elementary components. More particularly, this invention is directed to a method of making electrical wiring and wiring connections for an electrical component, which component may have many electrodes which are not located on the same plane, such that lead wires can be attached to the electrodes concurrently.

Description of the prior art

There have been proposed various methods of making electrical wiring and wiring connections for small electrical assemblies in which elementary components, such as semiconductor integrated circuit devices, resistors, capacitors or the like are mounted on a baseboard. However, the methods proposed in the past are complicated and not suitable for mass production.

BRIEF DESCRIPTION OF THE FIGURES

Like reference numerals throughout the various views of the drawings are intended to designate the same or similar structure.

DESCRIPTION OF THE PREFERRED EMBODIMENTS

Figure 1:
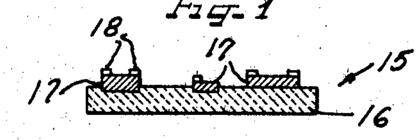
FIGURE 1 is a cross-sectional view illustrating one example of an electrical assembly.

With reference to the drawings, and in particular to FIGURE 1, there is illustrated an electrical component assembly, generally designated with the reference numeral 15, which is generally formed of a base 16 having a plurality of elementary components 17 mounted thereon. The base 16 may be made of, for example, glass, ceramic, or the like. The elementary components 17 may be resistors, capacitors, coils, or other electrical circuit elements. A plurality of electrodes 18 are formed on an upper surface of each of the elementary components 17 to which electrical connections may be made.

Figure 2:
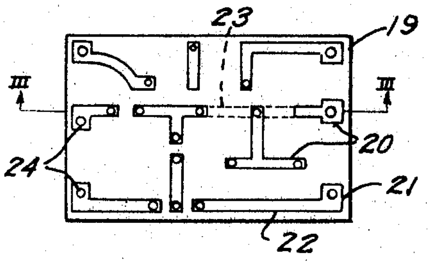
FIGURE 2 is a top plan view showing a thermoplastic board and conductive circuit patterns mounted thereon.
Figure 3:
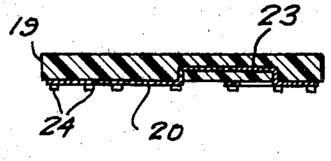
FIGURE 3 is a cross-sectional view taken along the line III—III in FIGURE 2.
Figure 4:
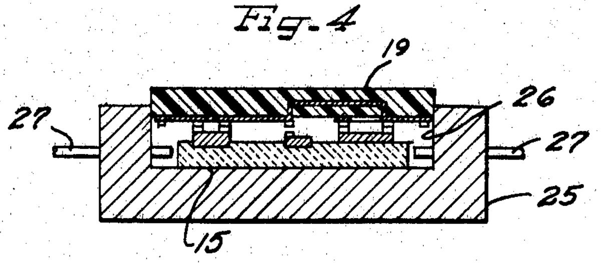
FIGURE 4 is a cross-sectional view illustrating the manner in which the thermoplastic board of FIGURE 2 is positioned on the electrical component assembly.

In accordance with the present invention, a thermoplastic board or panel 19, illustrated in FIGURES 2 and 3, is prepared which has formed, at least on one side thereof, conductive circuit patterns 20, each corresponding in position and in shape to either conductor leads, which will be ultimately attached to the electrical component 16, or to the electrodes 18. The thermoplastic board 19 is made of a material such, for example, as low melting point glass, fluorine resin, a thermoplastic resin of polyethylene, or the like, which softens or melts at a temperature lower than the upper temperature limit to which the electrical component assembly 15 can be raised. The conductive circuit patterns 20 may be formed by vapor deposition or plating of a metal which readily forms a relatively low ohmic contact. The conductive circuit patterns 20 are configured by the usual means, such as a mask which corresponds to a predetermined pattern, or by selective etching of the vapor-deposited or plated metal layer. In the making of the conductive circuit patterns 20, a chrome layer is firstly deposited by vacuum deposition for facilitating adhering of the circuits, copper is then laid on the chrome layer for enhancing conductivity of the circuits, and gold having an affinity for solder is thereafter deposited on the copper coating. It is also possible to form the conductive circuits by depositing a nickel layer and depositing silver thereon or by depositing a metal such as platinum, gold, silver or the like on Kovar. In addition, a conductive paint, such as silver paste or the like, may be employed in the formation of the conductive circuits 20. The thickness of the conductive circuits 20 depends upon the material used and the current to be applied thereto, but it must be greater than 0.4 micron in order to provide sufficient mechanical strength to the conductive circuits and to provide sufficient current capacity thereto. In short, the conductive circuits 20 are formed of such a thickness so as to be deformable in accordance with deformation of the thermoplastic board 19 due to softening thereof. It is preferred to form the area of the end portions 21 of the conductor circuits 20 larger than the remaining strip portions 22 thereof. These end portions 21 are ultimately connected either to the electrodes 18 of the electrical component assembly 15 or directly to external lead wires. The enlarged end portions 22 facilitate positioning required when assembling the thermoplastic board 19 with the electrical component assembly 15. Further, the conductive circuits 20 need not be entirely exposed on the surface of the thermoplastic board 19, and only the portions of the conductive circuits which are to be connected to the electrical component assembly 15 or to external lead wires need be exposed externally of the thermoplastic board 19. Particularly one portion of the circuit 20, for example that portion designated with the reference numeral 23 in FIGURE 3, is located internally of the thermoplastic board 19 or may be located on the opposite side thereof so that such pattern elements of the conductive circuit 20 can be spaced apart from one another.

Following the formation of the conductive circuits 20, solder 24 is deposited on the conductive circuits 20, or may be alternately deposited on the electrodes 18 of the components 17. The deposition of the solder 24 may take place by vapor deposition or dip-soldering. In this case, it is preferred that the solder 24 be deposited only on the ends of the conductive circuits 20 which are to be connected to the electrodes 18 of the electrical assembly 15 or to external lead wires, while covering the remaining parts with an oxide film or the like. Further, the solder is preferably made of a material having substantially the same melting point as the softening temperature of the thermoplastic board 19. More particularly, the solder 24 may be a low melting point solder having melting point of approximately 150° C., a silver-tin allow having a melting point of approximately 220° C., or a bismuth-tin alloy having a melting point of about 139° C.

After the deposition of the solder 24 the thermoplastic board 19 is placed on the electrical component assembly 15 in such a manner that the conductive circuits 20 on the thermoplastic board 19 face the electrodes 18 of the electrical component assembly 15. It is preferred, in this case, to employ a positioning plate 25 for facilitating positioning of the thermoplastic board 19 and the electrical component assembly 15. To this end, the positioning plate 25 has formed therein a recess 26. The electrical component assembly 15 is placed in the recess 26 and the thermoplastic board 19 is partially inserted into the recess 26 of the positioning plate 25 with the upper inner margin of the recess 26 engaged with the outer margin of the thermoplastic board 19. When the board 19 is positioned in the recessed plate 25, the electrodes 18 of the electrical component assembly 15 and the respective portions of the conductive circuits 20 are disposed in opposing relation with one another. The positioning plate 25 may be made of ceramic or a heat-proof resin or the like such as, for example, epoxy resin, or the like, which is sufficiently heat-resisting as not to be deformed at the softening temperature of the thermoplastic board 19. The ends of external lead wires 27 to be connected to the electrical component assembly 15 are attached to the peripheral portion of the positioning plate 25 at such positions below the particular portions of the conductive circuits 20 to which they are to be connected.

Figure 5:
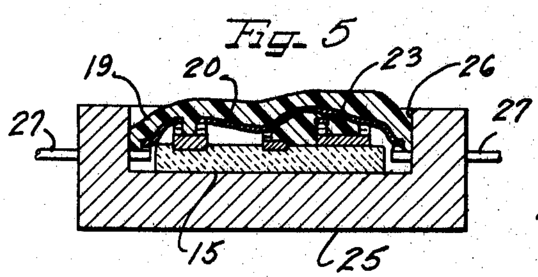
FIGURE 5 is a cross-sectional view illustrating one example of the electrical component assembly having lead wires attached thereto by the method of this invention.

After the thermoplastic board 19 has been placed on the electrical component assembly 15, as above described, the entire assembly is heated to soften or melt the thermoplastic board 19. In such a case, the softened thermoplastic board 19 sags, due to its weight, down to the upper surface of the electrical component assembly 15 and overlies it with the underside of the thermoplastic board 15 conforming substantially in shape to the shape of the upper surface of the component assembly 15, with the result that the conductive circuits 20 engage and make contact with corresponding electrodes 18 of the components 17, as illustrated in FIGURE 5. At the same time, respective portions of the conductive circuits 20 and the corresponding external lead wires 27 engage and make contact with one another. The conductive circuits 20 on thermoplastic board 19 and the electrodes 18 on the electrical component assembly 15 are coupled with each other by the solder previously deposited, which is thereafter cooled down to normal temperature.

The heating temperature mentioned above is approximately 160° C. where the thermoplastic board 19 is made of powder of incompletely cured epoxy resin such as, for example, that which commercially known under the name of E-Pellet, and it is about 200° C. or more when using trifluoroethylene resin or fluorinated ethylene-propylene resin, and further the heating temperature is about 100° C. when using polyethylene. In the case where the melting point of the solder 24 is higher than the heating temperature, the solder 24 is made molten by further heating after the conductive circuits 20 contact the electrodes 18 of the component assembly 15 or the heating temperature is raised higher than the melting point of the solder from the beginning of the heating process. When the thermoplastic board 19 is made of the low melting point glass, the heating temperature can be selected to be various values.

Figure 6:
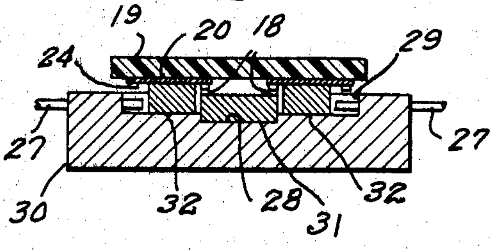
FIGURE 6 is a cross-sectional view illustrating another example in which the thermoplastic board is placed on an electrical component.

In the foregoing, electrical components are mounted on the base 16 to form the component assembly 15, but a semiconductor integrated circuit device may also be employed. Figure 6 illustrates another example of this invention as applied to a semiconductor integrated circuit device. In particular, a small recess 28 is formed centrally of a recess 29 in a positioning plate 30, by which a semiconductor integrated circuit device 31 is positioned on the positioning plate 30, and spacers 32 for positioning and prevention of shorting are provided around the integrated circuit device 31. The other remaining components are the same as those described in the foregoing example. The spacers 32 extend upwardly from the upper surface of the positioning plate 30 and above the upper surface of the semiconductor integrated circuit device 31, and position the thermoplastic board 19 relative to the positioning plate 30 to prevent unwanted contact of conductive circuits 20 with portions other than electrodes 18 of the semiconductor integrated circuit device 31, so as to avoid shorting of the device 31.

In accordance with the present invention, if an electrical part, such as the element 31, has many electrodes, lead wires can be simultaneously attached to each of them by the use of the above described conductive circuits. As compared with a conventional wiring method in which each lead wire is heat-pressed to each electrode, the operation of wiring according to this invention can be easily effected in a short time. Further, if the electrodes 18 are not located on the same plane, the use of the thermoplastic board 19 ensures that the conductive circuits 20 can all be concurrently connected with the electrodes 18 at desired points.

In addition, after the thermoplastic board 19 has been softened or molten to conform in shape and provide a circuit for the component assembly 15, the electrical component 31 or the assembly 15 and the conductive circuits 20 are entirely covered by the thermoplastic board 19, and the molten material of the thermoplastic board 19 on the exterior thereof becomes hard when cooled down to normal temperature. Therefore, the electrical component 31 and the assembly 15 are sealed from atmosphere. In this case, it is preferred to make the thermoplastic board 19 of an epoxy resin. It is, of course, possible to house the entire assembly in a case, if necessary.

If the external lead wires 27 are not attached to the positioning plate 25 or 30, the positioning plate may be disassembled from the electrical component 31 or from the assembly 15 after wiring. If desired, a plurality of elementary components may be placed on the positioning plate 30 at predetermined positions and electrical connections made to the electrodes of each of the elementary components, after which the positioning plate 30 is removed, while the individual components are mechanically held together as an electrical assembly by the thermoplastic board 19.

Referring to FIGURES 7 to 11, other examples of this invention will hereinafter be described.

Figure 7:
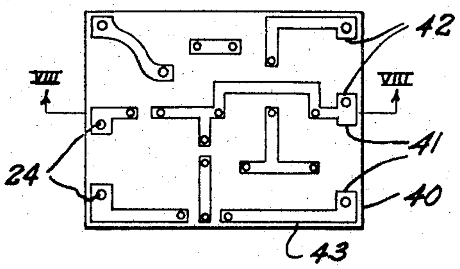
FIGURE 7 is a top plan view of a flexible membrane having mounted thereon patterns of conductive circuits.
Figure 8:
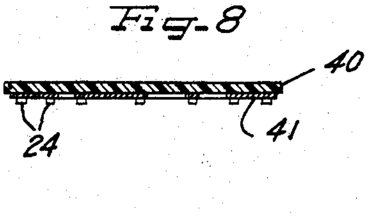
FIGURE 8 is a cross-sectional view taken along the line VIII—VIII in FIGURE 7.
Figure 9:
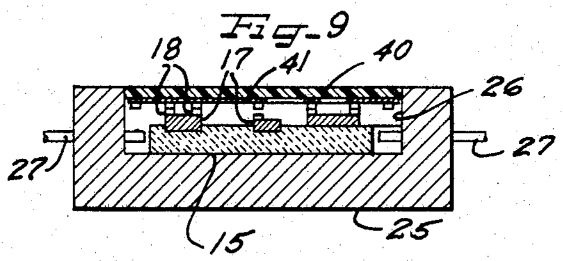
FIGURE 9 is a cross-sectional view illustrating the manner in which the flexible membrane of FIGURE 7 is positioned on the electrical component assembly.

In the example illustrated in FIGURES 7 and 8, a flexible membrane 40 is provided which has formed, at least on one side thereof, conductive circuits 41, each corresponding in position and in shape to each of conductor leads which will be ultimately attached to the aforementioned electrical component 31 or the assembly 15. The flexible membrane 40 may be a sheet of thin paper or a flexible synthetic resin film. The conductive circuits 41 may be formed by vapor deposition or plating of a metal such as nickel, Kovar or the like which readily forms a low ohmic contact. The conductive circuits 41 are configured by the use of a mask having predetermined patterns or by selective etching of a metal layer which is vapor-deposited or plated as described above. The conductive circuits 41 may be coated with a metal such as platinum, gold, silver or the like for obtaining a good soldering surface. The conductive circuits 41 may also be formed by depositing a chrome layer on the flexible membrane 40 to facilitate adhering of the finished conductive circuits thereto, and copper is then deposited on the chrome layer to enhance conductivity of the circuits, on which is then deposited gold having an affinity for solder. It is also possible to use a conductive paint such as silver paste or the like for forming the conductive circuits 41. The thickness of the conductive circuits 41 depends upon the material used and current to be applied thereto; that is, upon the mechanical strength of the conductive circuits and current capacity thereof. The thickness is selected such that the conductive circuits can be easily bent, although the thickness is preferably greater than 0.4 microns. Further, it is preferred to form the end portions 42 of the conductive circuits 41 larger than the remaining portions 43 thereof. The end portions 42 are ultimately to be connected to the electrodes 18 of the assembly 15 or component 31 or directly to the external lead wires 27. Furthermore, the enlarged end portions 42 facilitate positioning required when assembling the flexible membrane 40 with the electrical assembly 15 or component 31.

Thereafter, solder 24 is deposited either on the electrodes 18 of the component or on the conductive circuits 41. The deposition of the solder may take place by vapor deposition or dip-soldering. In this case, it is preferred to deposit the solder on the conductive circuits 41 only at their enlarged ends 42 which are to be connected to the electrodes 18 of the electrical component or to the external lead wires 27, while the other portions are coated with oxide film or the like.

Furthermore, it is preferred to coat the flexible membrane 40 with rosin or the like which functions as flux when soldering.

After depositing the solder 24, the flexible membrane 40 is disposed on the assembly 15 with the conductive circuits 41 opposed to and facing the electrodes 18 of the components 17. To facilitate the positioning of the flexible membrane 40 and the electrical assembly 15, the positioning plate 25 is employed, which has formed therein the recess 26. The electrical assembly 15 is disposed in the recess 26, and the inner margin of the recess 26 and the outer margin of the flexible membrane 40 are conformably with one another. Therefore, when the flexible membrane 40 is placed in the recess 26, the respective portions of the conductive circuits 41 may face opposite to the corresponding electrodes 18. In addition, the external lead wires 27 are previously attached to the peripheral portion of the positioning plate 25 at predetermined positions in such a manner that the corresponding conductive circuits 41 face opposite to the inner ends of the external lead wires 27.

The positioning plate 25 is made of a heat-proof synthetic resin, ceramic, or the like, having a softening temperature higher than the melting point of the solder 24.

Figure 10:
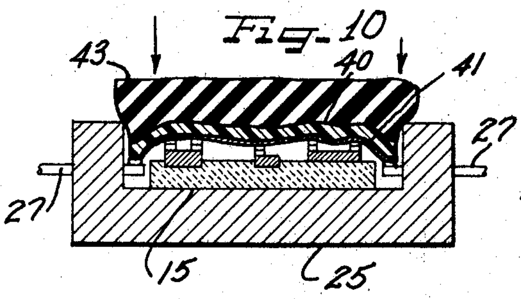
FIGURE 10 is a cross-sectional view illustrating the manner in which the flexible membrane of FIGURE 7 is pressed on the electrical component assembly.

Subsequent to placing the flexible membrane 40 on the electrical assembly 15 as described above, the electrical assembly 15 is heated to melt the solder 24 while pressing the flexible membrane 40 over the entire surface of the electrical assembly 15 through a heat-proof resilient piece 43 made of, for example, fluorinated resin, silicone rubber or the like, as illustrated in FIGURE 10. Then, the entire assembly is cooled down to normal temperature and, if necessary, is rinsed with a solvent such as toluene, or the like, to remove the flexible membrane 40 and rosin, leaving only the conductive circuits 41 on the electrical assembly 15. The resulting member is then subjected to a surface treatment and sealed with resin glass, or the like.

In accordance with this invention, if the electrical assembly 15 contains a plurality of electrodes 18, electrical connections to the electrodes 18 can be concurrently carried out by the formation of conductive circuits. As compared with the method of heat pressing each lead wire to each electrode, operations for wiring according to the present invention can be accomplished extremely easily and in a short time. Even if the plurality of electrodes 18 of the electrical assembly 15 are not located in the same plane, the respective portions of the conductive circuits can accurately be attached to their corresponding electrodes 18 by resiliently pressing the flexible membrane 40 on to the electrical assembly 15. When flux such as rosin, or the like, has been previously coated on the flexible membrane 40, heating of the electrical assembly 15 and the flexible membrane 40 will melt the rosin which will then perform the function of a flux when soldering the electrodes 18 and the conductive circuits 41, thus ensuring a good connection. Further, if the flexible membrane 40 is made of a transparent material, positioning of the conductive circuits 41 and the electrical assembly 15 can be accomplished while observing their relative positions through the flexible membrane 40.

Figure 11:
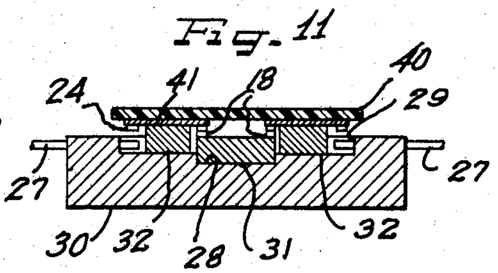
FIGURE 11 is a cross-sectional view illustrating another example in which the flexible membrane is placed on an electrical component.

In the foregoing, an electrical assembly is employed, but a semiconductor integrated circuit device can also be employed. FIGURE 11 shows another example of this invention as applied to the semiconductor integrated circuit device 31. The illustrated example employs a positioning plate 30 which contains the small recess 28 centrally of the recess 29 therein. The semiconductor integrated circuit device 31 is placed in the small recess 28 and the spacers 32 are disposed around the semiconductor integrated circuit 31. The spacers 32 extend upwardly of the upper surface of the positioning plate 30 and the electrical component 31, and serve to position the flexible membrane 40 relative to the positioning plate 30 and to prevent unwanted contact of the conductive circuits 41 with portions other than the electrodes 18 of the semiconductor integrated circuit device 31, so as to avoid shorting of the integrated circuit 31.

The electrical component 31 may be an elementary part such as a transistor, a resistance element, or the like, and other than a semiconductor integrated circuit device. Further, electrical connections can be made with both internal and external lead wires. In addition, positioning of the flexible membrane 40 can be accomplished by the use of pins mounted on the positioning plate 30 which cooperate with holes made in the flexible membrane 40. The positioning of the flexible membrane 40 can also be effected by other various means well known in the art.

It will be apparent that many modifications and variations may be effected wthout departing from the scope of the novel concepts of this invention.

The invention claimed is:

1. A method of making electrical circuit connections composed of the steps of: attaching a plurality of components on a heat resistant base, forming electrodes on the exposed surface of said components, depositing solder on said electrodes, forming conductive patterns on a thermoplastic board, placing the thermoplastic board over said heat resistant base with the conductive patterns adjacent the solder containing electrodes and certain of said solder containing electrodes in engagement with portions of said conductive patterns and other solder containing electrodes spaced from said conductive patterns, heating simultaneously said solder to melting and said thermoplastic board such that it deforms and moves the conductive pattern to engage all of the solder containing electrodes on said components, and cooling to thereby provide the patterns solder bonded to the electrodes.

2. The method as defined in claim 1, wherein certain portions of the conductive pattern on the thermoplastic board lies in different planes.

3. A method of making electrical circuit connections composed of the steps of: attaching a plurality of components on a heat resistant base, forming electrodes on the exposed surface of said components, forming conductive patterns on a thermoplastic board, depositing solder on the conductive patterns, placing the thermoplastic board over said heat resistant base with the solder containing conductive patterns adjacent the electrodes and certain of said electrodes in engagement with solder portions of said conductive pattern and other electrodes spaced from said solder containing conductive patterns, heating simultaneously said solder to melting and said thermoplastic board such that it deforms and moves the solder containing conductive pattern to engage all of the electrodes on said components, and cooling to thereby provide the patterns solder bonded to the electrodes.

4. The method as defined in claim 3, wherein certain portions of the conductive pattern on the thermoplastic board lie in different planes.

References Cited

UNITED STATES PATENTS

| | | | |
|---|---|---|---|
| 3,292,241 | 12/1966 | Carroll | 29—625 XR |
| 2,613,252 | 10/1952 | Heibel. | |
| 2,876,393 | 3/1959 | Tally et al. | 29—626 XR |
| 2,997,521 | 8/1961 | Dahlgren | 156—3 XR |
| 3,070,650 | 12/1962 | Stearns | 174—68.5 XR |
| 3,216,089 | 11/1965 | Dettmann. | |
| 3,247,578 | 4/1966 | Jaremus et al. | |
| 3,266,125 | 8/1966 | Tobolski. | |
| 3,270,399 | 8/1966 | Ohntrup. | |
| 3,290,756 | 12/1966 | Dreyar | 29—626 |

JOHN F. CAMPBELL, Primary Examiner

R. W. CHURCH, Assistant Examiner

U.S. Cl. X.R.

29—471.9, 502, 625, 626, 627, 628, 573, 577, 588; 174—68.5; 317—101, 234; 264—272